US008549023B2

(12) United States Patent  
Guo et al.

(10) Patent No.: US 8,549,023 B2  
(45) Date of Patent: Oct. 1, 2013

(54) METHOD AND APPARATUS FOR RESORTING A SEQUENCE OF SORTED STRINGS

(75) Inventors: Yu Guo, Westford, MA (US); Qi Lu, Beijing (CN); Jin Zhu, ShangLuo (CN); Zhi Bo Zuo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 12/274,425

(22) Filed: Nov. 20, 2008

(65) Prior Publication Data

US 2009/0138474 A1 May 28, 2009

(30) Foreign Application Priority Data

Nov. 22, 2007 (CN) .......................... 2007 1 0186838

(51) Int. Cl.
*G06F 7/00* (2006.01)
(52) U.S. Cl.
USPC ............ 707/758; 707/790; 707/748; 709/201
(58) Field of Classification Search
USPC .................................. 707/758, 790; 709/201
See application file for complete search history.

(56) References Cited

U.S. PATENT DOCUMENTS

| 5,675,818 | A | * | 10/1997 | Kennedy ............................ 704/8 |
| 5,793,381 | A | | 8/1998 | Edberg et al. |
| 5,799,303 | A | | 8/1998 | Tsuchimura |
| 6,601,108 | B1 | | 7/2003 | Marmor |
| 7,218,252 | B2 | | 5/2007 | Fauque |
| 2005/0251519 | A1 | * | 11/2005 | Davis ............................ 707/100 |
| 2006/0074971 | A1 | | 4/2006 | Groenveld |
| 2006/0100857 | A1 | | 5/2006 | Wissink et al. |

* cited by examiner

*Primary Examiner* — Tony Mahmoudi  
*Assistant Examiner* — Tuan-Khanh Phan  
(74) *Attorney, Agent, or Firm* — Jeff Tang; Hoffman Warnick LLC

(57) ABSTRACT

A method and apparatus for resorting a sequence of sorted strings, wherein the sequence of sorted strings is obtained by sorting a plurality of strings based on a first character collation standard and the resorting is based on a second character collation standard. A method in accordance with an embodiment of the invention includes: comparing the first character collation standard with the second character collation standard to obtain a change of the character collation standard; and resorting the sequence of sorted strings based on the change of the character collation standard. The method of the present invention takes the change of the character collation standard and its affection to the sequence of sorted strings into consideration, and can resort the sequence of sorted strings quickly and thus save time for resorting.

13 Claims, 6 Drawing Sheets

METHOD AND APPARATUS FOR RESORTING A SEQUENCE OF SORTED STRINGS

FIELD OF THE INVENTION

The present invention relates to a string sorting technique, particularly to a method and apparatus for resorting a string sequence consisting of sorted strings.

RELATED ART

In a database application, it is often necessary to sort strings. For example, when building indexes of a database, the strings being the indexes would be sorted. The string sorting technique requires two main factors: a character collation standard and a string comparing algorithm. When the strings are sorted, characters in the strings are compared with each other using the string comparing algorithm according to the character collation standard, and then the strings are sorted according to the comparison result.

The character collation standard (hereinafter called CS) is a rule for describing collation relationships among the characters. For example, "a"<"b"<"c"<"d" . . . , provides a collation sequence among the letters which is the character collation standard. In addition, Unicode 3.0, Unicode 4.1 and the like are also character collation standards.

In the prior art, there are two types of string comparing algorithms, i.e., a non-class string comparing algorithm (common string comparing algorithm) and a classed string comparing algorithm. A typical non-class string comparing algorithm is a string processing function strcmp( ) in C-language Application Program Interface (API). A typical classed string comparing algorithm is a Unicode Collation Algorithm (UCA) and its detailed information can be obtained from the Unicode official website unicode.org.

Here, the UCA is described briefly. The Unicode defines a united and unique binary code for each character of each language. Although identical characters may be used in different countries, these characters may have different collation rules in different languages. For example, some characters in Chinese and Japanese are identical in form, but are different in meaning. Accordingly, the collation rules of these characters are also different. For example, many languages use 26 English letters, but the collation rules among these letters may be different. For example in Lithuanian, the letter "y" is arranged between the letter "i" and the letter "k." Also for example, in a language using Latin letters, some letters have tone marks, such as "á", "é", etc. However, in most cases it is default that the common letters are same as those with tone marks.

To unify the character comparing rules in the world, the UCA algorithm is proposed. The UCA algorithm divides the character comparison into 4 classes. The first class is the simplest character comparison, such as a=A<b. The second class adds comparison of the characters with tone marks, such as a<á<b. The third class adds comparison of capital and small letters, such as a<A;. The fourth class is the character comparison in consideration of some special characters, such as ab<a-b<aB. Accordingly, when the characters are compared with each other using the UCA, there may exist the situation where two characters are equal at the first class, but are not equal at other classes. However, if two characters are not equal at the first class, they must be not equal at other classes. As a result, when the UCA is used in the character comparison, it is necessary to compare the characters at all classes and only when the two characters are equal at all the grades, the two characters are considered as equal.

Next an simple example is given for describing the string sorting, wherein the character collation standard is "a"<"b"<"c"<"d" . . . , as stated above, and the string comparing algorithm is the common string comparing algorithm and the character comparison begins from the first letter. In this way, with respect to two strings "apple" and "banana", the first letters are compared with each other. According to the character collation standard "a"<"b", the string "apple" is arranged before the string "banana". If the character comparison begins from the last letter, according to the character collation standard "a"<"e", the string "apple" is arranged after the string "banana."

However, in fact, due to the version update or locale difference, the character collation standard may be changed. For example, in the Unicode 3.0, the characters "_" (0x5F), "`" (0x60) and "^" (0x5E) are collated as "_" (0x5F)<"`" (0x60) <"^" (0x5E). While in the Unicode 4.1, the collation of the above characters are changed as "`" (0x60)<"^" (0x5E)<"_" (0x5F) and the collation rule for the other characters is unchanged. Again, for example, in the English locale, the Unicode 4.1 defines that the character "v" is less than the character "w." While in the Swedish locale, the Unicode 4.1 defines that the character "v" is equal to the character "w" if case-insensitive.

Since the character collation standard has changed, the sorted strings are required to be resorted. For example, the Lotus Domino 8 system of IBM uses a new character collation standard different from that in the existing Lotus Domino system so that the indexes of the database in the Lotus Domino system would be rebuilt according to the new character collation standard.

In the prior art, usually the strings are sorted directly according to the new character collation standard using a sorting method, such as an insertion sorting algorithm, without considering whether those strings have been sorted. A basic principle of the insertion sorting algorithm is that each time a character/string to be sorted is inserted into a proper position in a sequence of the sorted strings previously according to the character collation standard until all the characters/strings are inserted. That is, for a first character/string to be sorted, it is would not be sorted; and for the next character/string to be sorted, it is compared with the sorted characters/strings one by one to determine the insertion position and then the character/string is inserted.

However, the change of the character collation standard is often trivial, that means most of the characters keep unaffected and the change can be described by some simple rules. The existing sorting methods do not consider the change between the old and new character collation standard and sort the characters corresponding to the unchanged portion of the character collation standard in the sequence of the sorted strings, which costs a great deal of time.

SUMMARY OF THE INVENTION

The present invention provides a method and apparatus for resorting a sequence of sorted strings which considers change of a character collation standard and can resort the sequence of sorted strings quickly so that it can save a great deal of time.

According to one aspect of the present invention, there is provided a method for resorting a sequence of sorted strings, wherein the sequence of sorted strings is obtained by sorting a plurality of strings based on a first character collation standard and the resorting is based on a second character collation standard, the method comprising: comparing the first character collation standard with the second character collation standard to obtain a change of the character collation standard; and resorting the sequence of sorted strings based on the change of the character collation standard.

According to another aspect of the present invention, there is provided an apparatus for resorting a sequence of sorted strings, wherein the sequence of sorted strings is obtained by sorting a plurality of strings based on a first character collation standard and the resorting is based on a second character collation standard, the apparatus comprising: a comparing module that compares the first character collation standard with the second character collation standard to obtain a change of the character collation standard; and a resorting module that resorts the sequence of sorted strings based on the change of the character collation standard.

DETAILED DESCRIPTION OF THE INVENTION

The above and other features and advantages of the present invention will become clearer through the following detailed description of the embodiments of the present invention in conjunction with the drawings.

Figure 1:
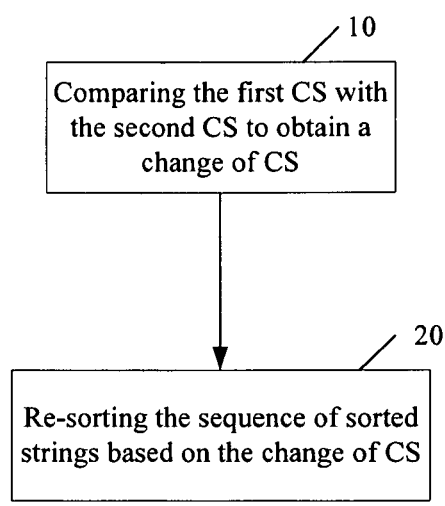
FIG. 1 is a flowchart showing a method for resorting a sequence of sorted strings according to one embodiment of the present invention.

FIG. 1 is a flowchart showing a method for resorting a sequence of sorted strings according to one embodiment of the present invention. This embodiment will be described in details in conjunction with FIG. 1.

In this embodiment, the sequence of sorted strings is obtained by sorting a plurality of strings based on an old character collation standard (a first character collation standard), when the character collation standard is changed into a new character collation standard (a second character collation standard), the sequence of sorted strings would be resorted according to the second character collation standard.

As shown in FIG. 1, firstly at Step 10, the first and second character collation standards are compared with each other to obtain a change of the character collation standard.

As stated above, the change of the character collation standard can be trivial. For example, the change between the Unicode 3.0 and Unicode 4.1 is merely that the adjacent position relation among the characters "_" (0x5F), "`" (0x60) and "^" (0x5E) is changed and other characters keep unaffected. Moreover, most of the changes of the character collation standard can be described by the change of the adjacent position relations of the characters. In this embodiment, the characters with unchanged adjacent position relations are represented by "Unaffected Character Block (UCB)". As a result, by dividing the characters in the second character collation standard into a plurality of UCBs, the change between the second character collation standard and the first character collation standard can be obtained.

Figure 2:
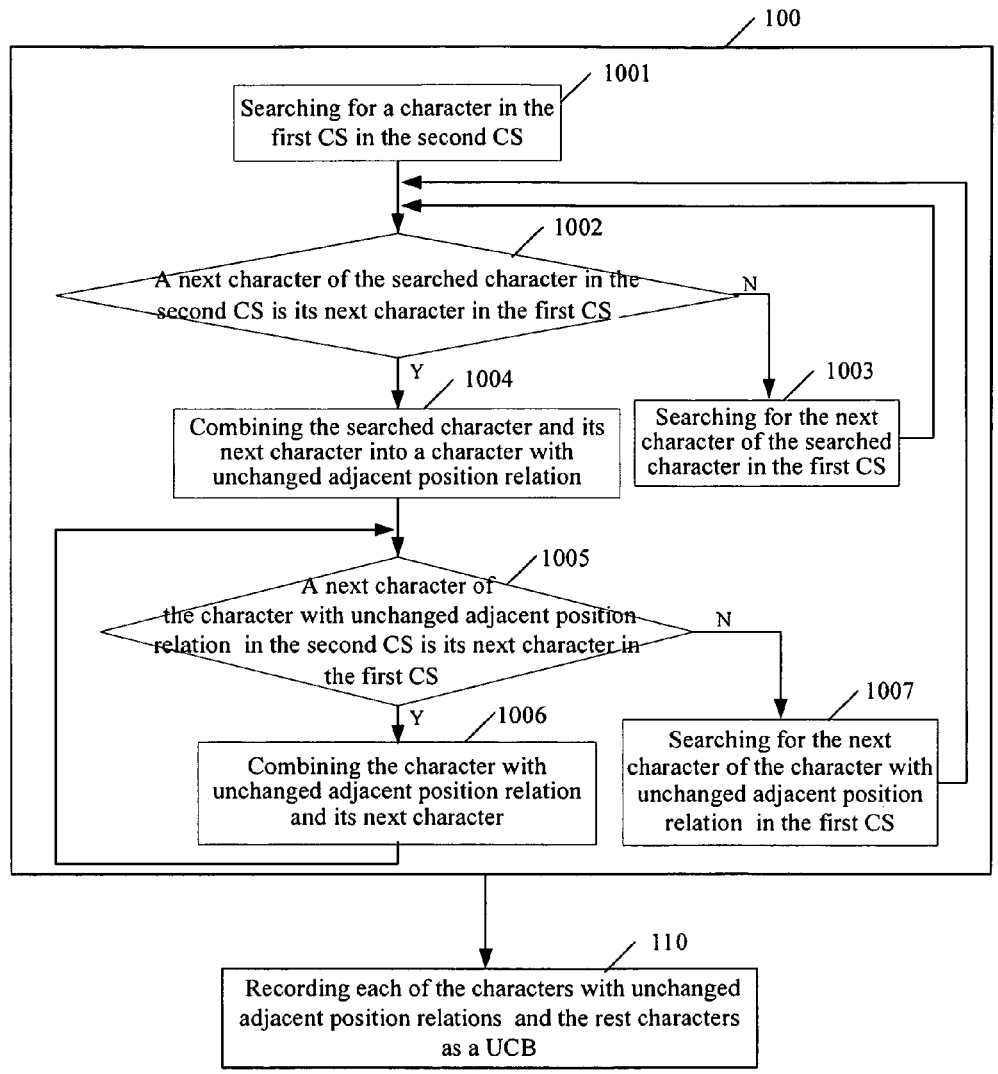
FIG. 2 is a flowchart of the step of comparing the first character collation standard with the second character collation standard in the embodiment as shown in FIG. 1.

FIG. 2 shows a flowchart of the step of comparing the first character collation standard with the second character collation standard in this embodiment.

Specifically, as shown in FIG. 2, at Step 100, the characters with unchanged adjacent position relations in the second character collation standard are found according to the first character collation standard. In Step 100, the methods of finding the characters with unchanged adjacent position relations are different in consideration of the difference between the two string comparing algorithms stated above. The finding methods corresponding to the non-class string comparing algorithm and the classed string comparing algorithm are described respectively as follows.

The finding method corresponding to the non-class string comparing algorithm

If the sequence of sorted strings are obtained using the non-class string comparing algorithm, this finding method is used to find the characters with unchanged adjacent position relations.

At first, at Step 1001, starting from the first character in the first character collation standard, the corresponding character in the second character collation standard is searched for. Then, at Step 1002, it is judged whether the next character of the searched character in the second character collation standard is its next character in the first character collation standard (first judging step). That is, it is judged whether the adjacent position relation of the searched in the second character collation standard is same as that in the first character collation standard.

If the next character of the searched character in the second character collation standard is not its next character in the first character collation standard, i.e., the adjacent position relation of the searched character is changed, at Step 1003, the next character of the searched character in the first character collation standard is searched for in the second character collation standard as a new searched character. Then the first judging step 1002 is performed to judge the new searched character.

If the next character of the searched character in the second character collation standard is its next character in the first character collation standard, i.e., the adjacent position relation of the searched character is unchanged, at Step 1004, the searched character and its next character in the second character collation standard are combined into a character with unchanged adjacent position relation. Then at Step 1005, it is judged whether the next character of the character with unchanged adjacent position relation in the second character collation standard is its next character in the first character collation standard (second judging step). That is, it is judged whether the adjacent position relation between the two characters in the second character collation standard is same as that in the first character collation standard.

If the next character of the character with unchanged adjacent position relation in the second character collation standard is its next character in the first character collation standard, i.e., the adjacent position relation between the two character is unchanged, at Step 1006, the character with unchanged adjacent position relation and the next character in the second character collation standard are combined into a new character with unchanged adjacent position relation. Then, the second judging step (Step 1005) is performed.

If the next character of the character with unchanged adjacent position relation in the second character collation standard is not its next character in the first character collation standard, i.e., the adjacent position relation between the two character is changed, at Step 1007, the next character of the character with unchanged adjacent position relation in the first character collation standard is searched for in the second character collation standard as the new searched character. Then the first judging step (Step 1002) is performed.

With the above steps, the characters in the second character collation standard can be divided into at least one character with unchanged adjacent position relation and other individual characters.

The finding method corresponding to the classed string comparing algorithm

If the sequence of sorted strings is obtained by using the classed string comparing algorithm including a plurality of character comparing classes, this finding method is used to find the characters with unchanged adjacent position relations. As stated above, when the classed string comparing algorithm is used to sort, the characters should be compared at all the character comparing classes and only when the two characters are equal at all the character comparing classes, they are considered as equal. As a result, the finding method corresponding to the classed string comparing algorithm requires that the first and second character collation standards would be compared with each other at all the character comparing classes to find the characters with unchanged adjacent position relations.

At the beginning of finding the characters with unchanged adjacent position relations, starting from the first character in the first character collation standard, the corresponding character in the second character collation standard is searched for. Then, at each of the plurality of character comparing classes, it is judged whether the next character of the searched character in the second character collation standard is its next character in the first character collation standard (third judging step).

If, at any one of the character comparing classes, the next character of the searched character in the second character collation standard is not its next character in the first character collation standard, the next character of the searched character in the first character collation standard is searched for in the second character collation standard as the new searched character. Then the third judging step is performed to judge the new searched character.

If, at all of the character comparing classes, the next character of the searched character in the second character collation standard is its next character in the first character collation standard, the searched character and its next character in the second character collation standard are combined into a character with unchanged adjacent position relation. Then at each of the plurality of character comparing classes, it is judged whether the next character of the character with unchanged adjacent position relation in the second character collation standard is its next character in the first character collation standard (fourth judging step).

If, at all of the character comparing classes, the next character of the character with unchanged adjacent position relation in the second character collation standard is its next character in the first character collation standard, the character with unchanged adjacent position relation and its next character in the second character collation standard are combined into a new character with unchanged adjacent position relation. Then, the fourth judging step is performed.

If, at any one of the character comparing classes, the next character of the character with unchanged adjacent position relation in the second character collation standard is not its next character in the first character collation standard, the next character of the character with unchanged adjacent position relation in the first character collation standard is searched for in the second character collation standard as a new searched character. Then the third judging step is performed on the new searched character.

With the above steps, the characters in the second character collation standard are divided into at least one character with unchanged adjacent position relation and other individual characters.

After the characters with unchanged adjacent position relations in the second character collation standard are obtained in Step 100, at Step 110, the characters with unchanged adjacent position relations and the rest of the characters in the second character collation standard are recorded and each character is regarded as a Unaffected Character Block (UCB).

Figure 3:
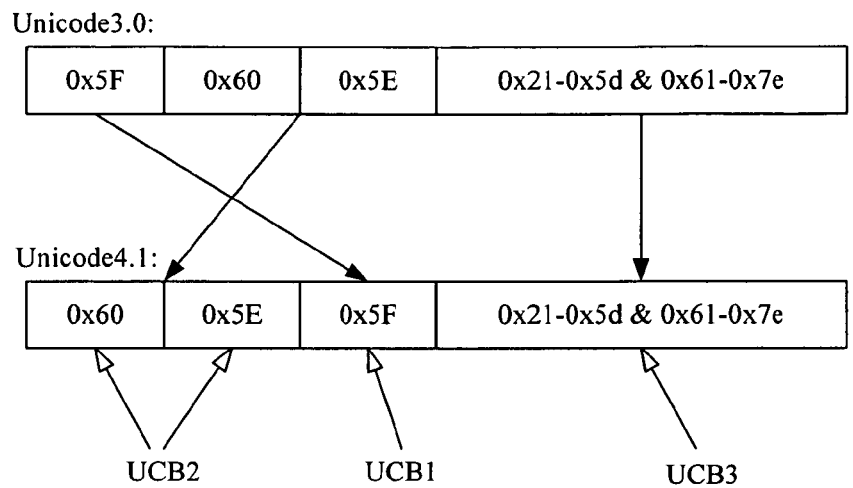
FIG. 3 is a schematic diagram for illustrating the step of comparing the first character collation standard with the second character collation standard in the embodiment as shown in FIG. 1.

Next an example is provided to illustrate the above step of comparing the first character collation standard with the second character collation standard. As shown in FIG. 3, the first character collation standard is Unicode 3.0 and the second character collation standard is Unicode 4.1. The first character of Unicode 3.0 is 0x5F and 0x5F is found in Unicode 4.1. Then, the next character 0x21 of the character 0x5F is found in Unicode 4.1. However in Unicode 3.0, the next character of the character 0x5F is 0x60. Thus, in Unicode 4.1, the adjacent position relation of the character 0x5F is changed. Then, the next character 0x60 of the character 0x5F in Unicode 3.0 is searched for in Unicode 4.1 and the next character 0x5E of the character 0x60 is found. In Unicode 3.0, the next character of the character 0x60 is 0x5E. Thus, the adjacent position relation between the characters 0x60 and 0x5E is unchanged, and the characters 0x60 and 0x5E are combined into a character with unchanged adjacent position relation. Then, the next character of the character with unchanged adjacent position relation in Unicode 4.1 is searched for and the character 0x5F is obtained. In Unicode 3.0, the next character of the character 0x5E is 0x21. Thus, the adjacent position relation of the character with unchanged adjacent position relation including the characters 0x60 and 0x5E is changed. Then, the next character 0x21 of the character 0x5E in Unicode 3.0 is searched for in Unicode 4.1 and the next character of the character 0x21 is also searched for. Then, it is judged whether the next character of the character 0x21 in Unicode 4.1 is same as that in Unicode 3.0. If the two characters are identical, they are combined into a character with unchanged adjacent position relation, and if the characters are different, the searching and judgment are continued. Such searching, judgment and combination are repeated until the last character in Unicode 3.0. In this example, the characters with unchanged adjacent position relations are 0x60 and 0x5E, and 0x21-0x5d & 0x61-0x7e. As a result, in Unicode 4.0, the UCBs include UCB1 consisting of the character 0x5F, UCB2 consisting of the characters 0x60 and 0x5E, and UCB3 consisting of the characters 0x21-0x5d & 0x61-0x7e.

Returning to FIG. 1, after the change of the character collation standard, i.e., the UCBs, is obtained, at Step 20, the sequence of sorted strings is resorted according to the change of the character collation standard.

Figure 4:
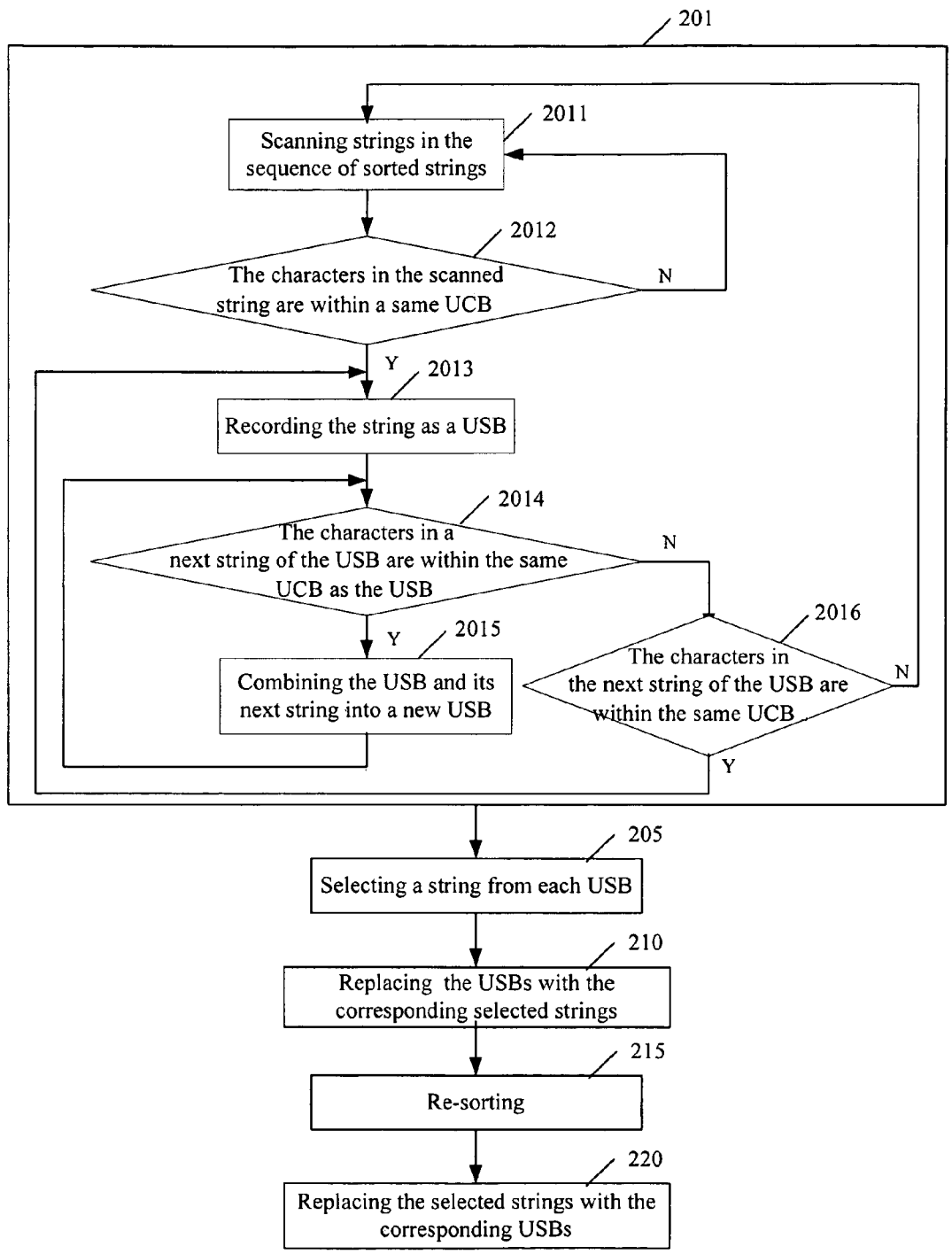
FIG. 4 is a flowchart of the step of resorting the sequence of sorted strings in the embodiment as shown in FIG. 1.

FIG. 4 is a flowchart of Step 20 of resorting the sequence of sorted strings according to the change of the character collation standard. As shown in FIG. 4, at Step 201, according to the UCBs obtained in Step 10, at least one Unaffected String Block (USB) is obtained from the sequence of sorted strings, wherein the USB includes at least one string consisting of the characters belonging to the same UCB. Since the characters of the strings within the USB are from the same UCB, those strings need not to be resorted.

At Step 2011, the string in the sequence of sorted strings is scanned from the first string, and at Step 2012, it is determined whether the characters contained in the currently scanned string are within the same UCB.

If the characters contained in the scanned string are not within the same UCB, Step 2011 is performed to scan the next string.

If the characters contained in the scanned string are within the same UCB, at Step 2013, the scanned string is recorded as a USB. Then at Step 2014, it is judged whether the characters contained in the next string of the USB in the sequence of sorted strings are within the same UCB as the USB.

If the characters contained in the next string of the USB are within the same UCB as the USB, at Step 2015, the USB and its next string are combined into a new USB. Then, the judging step (Step 2014) is performed.

If the characters contained in the next string of the USB are not within the same UCB as the USB, at Step 2016, it is determined whether the characters contained in the next string are within a same UCB.

If the characters contained in the next string are within the same UCB, Step 2013 is performed. If the characters contained in the next string are not within the same UCB, Step 2011 is performed.

The above steps are repeated until the last string of the sequence of sorted strings.

By performing the above steps, the USB can be obtained. As a result, the sequence of sorted strings can be divided into at least one USB and other strings.

Then, at Step 205, a string is selected from each of the USBs obtained in Step 201. Since the strings within the USB are need not to be resorted, any one string can be selected from each USB as a representative of the USB. Generally, the first string in the USB is selected.

At Step 210, in the sequence of sorted strings, the USBs are replaced with the corresponding selected strings to form a new sequence of strings. Then, at Step 215, the new sequence of strings is sorted according to the second character collation standard. In Step 215, any existing sorting algorithm, such as insertion sorting algorithm, can be used.

Then, at Step 220, for the sorted new sequence of strings, the selected strings are replaced with the corresponding USBs. In this way, the obtained sequence of strings is the resorted sequence of strings.

Figure 5:
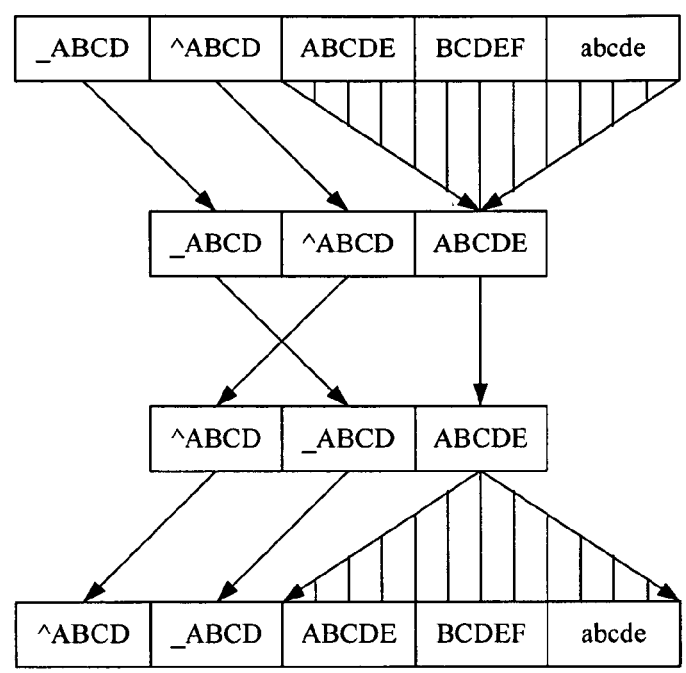
FIG. 5 is a schematic diagram for illustrating the step of resorting the sequence of sorted strings in the embodiment as shown in FIG. 1.

Next an example will be provided to illustrate the step of resorting the sequence of sorted strings based on the change of the character collation standard. As shown in FIG. 5, the sequence of sorted strings are "_ABCD," "^ABCD," "ABCDE," "BCDEF," and "abcde". The first and second character collation standards are Unicode 3.0 and Unicode 4.1 respectively. In addition, a plurality of UCBs, i.e., UCB1, UCB2 and UCB3, is obtained through the example as shown in FIG. 3.

At first, the first string "_ABCD" is scanned. It is determined that the "_" in the string belong to the UCB1 and "A" belongs to the UCB3. Thus, the characters in the string are not within the same UCB, and the string is not a USB. Next, the second string "^ABCD" is scanned. Similarly, this string is also not a USB. Next, the third string "ABCDE" is scanned and it is determined that all the characters in this string belong to the UCB3. Then, this string is recorded as a USB. Then, the next string of the USB is judged, i.e., to judge whether all the characters in the fourth string "BCDEF" are within the UCB3. The judging result is that the string "BCDEF" is composed of the characters within the UCB3 and thus the string "BCDEF" and the USB "ABCDE" are combined into a new USB. Finally, it is judged whether all the characters in the fifth string "abcde" are within the UCB3 and the judging result is that the string "abcde" is composed of the characters within the UCB3. Thus, the string "abcde" and the USB ("ABCDE"+"BCDEF") are combined into a new USB. As a result, the sequence of sorted strings includes one USB ("ABCDE"+"BCDEF"+"abcde") and two strings which are not the USBs.

Then, a string, for example "ABCDE," is selected from the USB ("ABCDE"+"BCDEF"+"abcde") to replace the USB. The string and the two strings which are not the USBs, "_ABCD" and "^ABCD" form a new sequence of strings. Then, the new sequence of strings is sorted using any sorting algorithm according to the second character collation standard Unicode 4.1. Here, the insertion sorting algorithm is used to sort. As a result, the new sequence of strings obtained after resorting is "^ABCD," "_ABCD," and "ABCDE".

Finally, the string "ABCDE" in the resorted sequence of strings is replaced with the USB and thereby the resorted sequence of strings is "^ABCD," "_ABCD," "ABCDE," "BCDEF" and "abcde."

It can be seen form the above description that the method of resorting the sequence of sorted strings in this embodiment can realize the resorting of the sequence of sorted strings by comparing the first character collation standard with the second character collation standard to determine the UCBs in the second collation standard and determining the USBs in the sequence of sorted strings according to the UCBs, thereby the sequence of sorted strings can be resorted quickly and the time for resorting can be saved.

Further, in this embodiment, a common character range (CCR) can be defined before comparing the first character collation standard with the second character collation standard. That is, the common characters are selected from all the characters and form the common character range. For example, the common character range is defined as 0x4E00-0x9FA5. Then, when the comparing step is performed, only the characters within the common character range in the first and second character collation standards are compared to obtain the UCBs. When the sequence of sorted strings is resorted according to the UCBs, it is judged whether the sequence of sorted strings contains any character out of the common character range. If the sequence contains the character out of the common character range, the sequence of sorted strings is resorted using the original sorting algorithm. If the sequence does not contain the character out of the common character range, the sequence of sorted strings is resorted using the resorting method of this embodiment.

Since the collation relationship among the common characters are relative fixed and the change is trivial, and when the character collation standard is changed, most of the affected characters are non-common characters, the characters affected by the change of the character collation standard can be reduced by defining the common character range, thereby further saving the resorting time.

Figure 6:
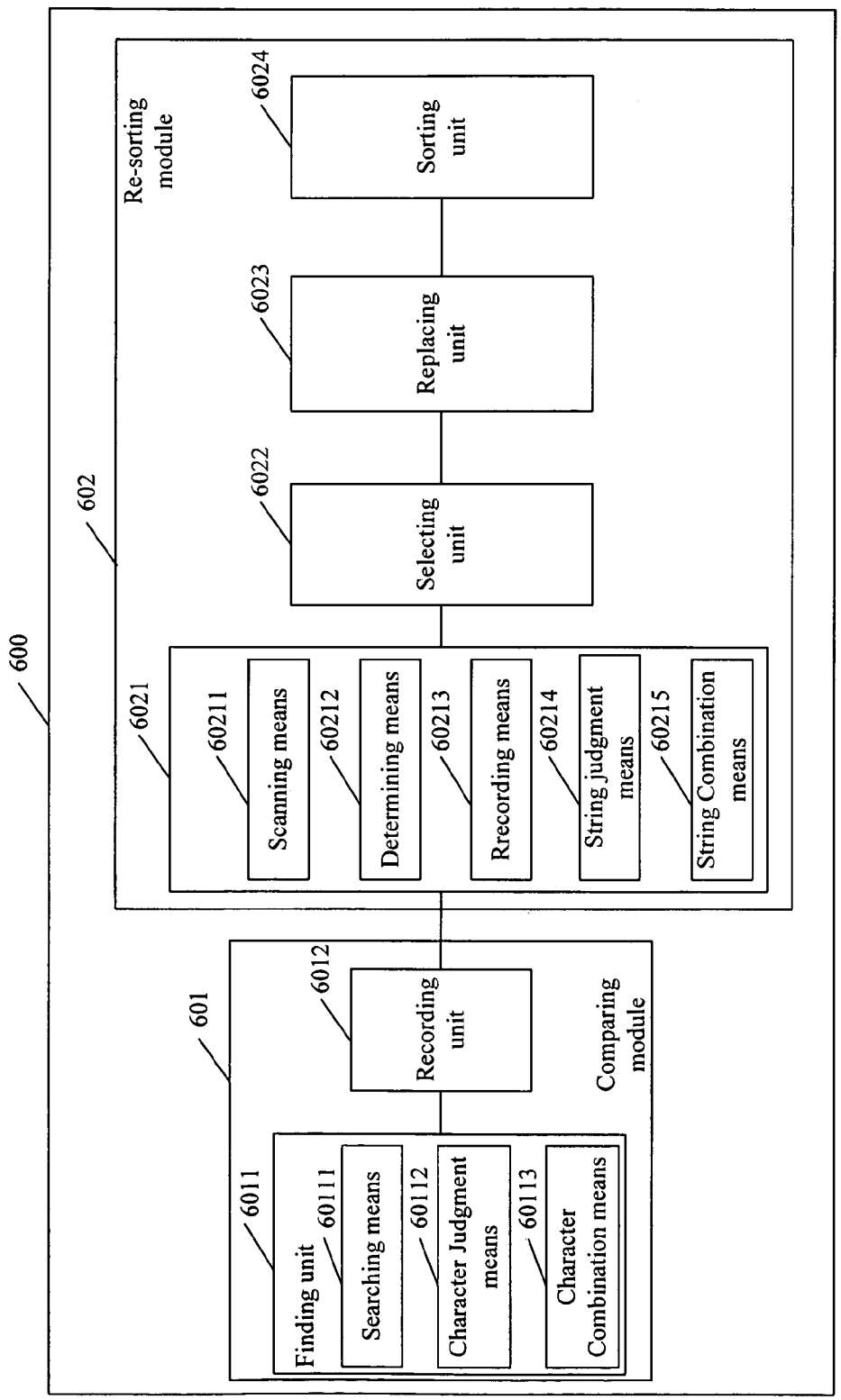
FIG. 6 is a schematic block diagram showing an apparatus for resorting a sequence of sorted strings according to one embodiment of the present invention.

Under the same inventive concept, FIG. 6 is a schematic block diagram showing an apparatus for resorting a sequence of sorted strings according to one embodiment of the present invention. This embodiment will be described in detail in conjunction with the figure.

In this embodiment, the sequence of sorted strings is obtained by sorting a plurality of strings based on a first character collation standard, and the resorting is based on the second character collation standard.

As shown in FIG. 6, the apparatus 600 for resorting a sequence of sorted strings of this embodiment comprises a comparing module 601 which compares the first character collation standard with the second character collation standard to obtain a change of the character collation standards; and a resorting module 602 which resorts the sequence of sorted strings based on the change of the character collation standards.

When the apparatus 600 for resorting a sequence of sorted strings of this embodiment is operated, the first and second character collation standards are provided to the comparing module 601 and then in the comparing module 601, firstly a finding unit 6011 finds the characters with unchanged adjacent position relations in the second character collation standard according to the first character collation standard.

In the finding unit 6011, when finding the characters with unchanged adjacent position relations, a searching means 60111 searches for the characters in the first character collation standard sequentially in the second character collation standard, and a character judgment means 60112 judges whether the next character of the currently searched character in the second character collation standard is its next character in the first character collation standard. If the judgment result is negative, i.e., the next character of the searched character in the second character collation standard is not its next character in the first character collation standard, the searching means 60111 searches for the next character of the searched character in the first character collation standard and the character judgment means 60112 performs judgment on the next character. If the judgment result is positive, i.e., the next character of the searched character in the second character collation standard is its next character in the first character collation standard, a character combination means 60113 combines the searched character and its next character in the second character collation standard into a character with unchanged adjacent position relation. Then, the character judgment means 60112 judges the character with unchanged adjacent position relation. When the character judgment means 60112 judges that the next character of the character with unchanged adjacent position relation in the second character collation standard is its next character in the first character collation standard, the character combination means 60113 combines the character with unchanged adjacent position relation and its next character in the second character collation standard into a new character with unchanged adjacent position relation. When the character judgment means 60112 judges that the next character of the character with unchanged adjacent position relation in the second character collation standard is not its next character in the first character collation standard, the searching means 60111 searches for the next character of the character with unchanged adjacent position relation in the first character collation standard and the character judgment means 60112 performs judgment on the next character.

In this way, by the finding unit 6011, the characters in the second character collation standard are divided into at least one character with unchanged adjacent position relation and other individual characters. Then, a recording unit 6012 records the at least one character with unchanged adjacent position relation and the individual characters respectively, each character is regarded as a UCB.

The UCBs and the sequence of sorted strings are inputted into the resorting module 602 to resort the sequence of sorted strings.

In the resorting module 602, at first an obtaining unit 6021 obtains the unaffected string blocks (USBs) in the sequence of sorted strings according to the UCBs, wherein the USB includes a string consisting of the characters belonging to the same UCB.

In the obtaining unit 6021, a scanning means 60211 scans the strings in the sequence of sorted strings sequentially and then a determining means 60212 determines whether the characters in the next string of the currently scanned string are within the same UCB. If the characters in the next string of the currently scanned string are not within the same UCB, the scanning means 60211 scans the next string in the sequence of sorted strings. If the characters in the next string of the currently scanned string are within the same UCB, a recording means 60213 records the currently scanned string as a USB. Then a string judgment means 60214 judges whether the characters in the next string of the USB in the sequence of sorted string are within the same UCB as the USB. If the judgment result is negative, the determining means 60212 determines whether the characters in the next string of the USB are within the same UCB. If the judgment result is positive, a string combination means 60215 combines the USB and its next string into a new USB.

In this way, the USBs can be found in the sequence of sorted string by the obtaining unit 6021.

Then, a selecting unit 6022 selects a string from each of the USBs as a representative of the corresponding USB. A replacing unit 6023 replaces the USBs in the sequence of sorted strings with the corresponding selected strings, thereby forming a new sequence of strings. Then, a sorting unit 6024 sorts the new sequence of strings according to the second character collation standard. For the sorted new sequence of strings, the replacing unit 6023 replaces the selected string with the corresponding USBs and thus a resorted sequence of strings is obtained.

Further, the apparatus 600 for resorting a sequence of sorted strings of this embodiment can comprise a common character set which stores a pre-defined common character range and a common character judgment module which judges whether the sequence of sorted strings contains a character out of the common character set and transmits the sequence of sorted strings to the resorting module 602 when the sequence of sorted strings contains no character out of the common character set. The common character set is also provided to the comparing module 601 so that the comparing module 601 only compares the characters within the common character set in the first and second character collation standards.

It should be pointed out that the apparatus 600 for resorting a sequence of sorted strings of this embodiment and its components can be implemented by hardware circuit such as Very Large Scale Integrated Circuit or gate array, semiconductor such as logic chips and transistors, or programmable hardware device such as field programmable gate array, programmable logic device, and by software executing on various types of processors, and by the combination of above hardware circuit and software. Also, the apparatus 600 for resorting a sequence of sorted strings of this embodiment may operatically realize the methods for resorting the sequence of sorted strings of the embodiments as shown in FIGS. 1, 2 and 4.

Although the method and apparatus for resorting a sequence of sorted strings are described in detail in conjunction with the preferred embodiment, the present invention is not limited as above. It should be understood for persons skilled in the art that the above embodiments may be varied, replaced or modified without departing from the spirit and the scope of the present invention.

The invention claimed is:

1. A method for resorting a sequence of sorted strings, comprising:
    obtaining the sequence of sorted strings by sorting a plurality of strings based on a first character collation standard;

comparing the first character collation standard with a second character collation standard to perform:
identifying a change of the character collation standard between the first and second collation standards, wherein the second character collation standard is different from the first character collation standard, and wherein the change of the character collation standard is a change of an adjacent position relation for each of at least two characters,
identifying at least two unchanged characters in each of the first and second collation standards, wherein the adjacent position for each of the at least two unchanged characters does not change, and
combining the least two unchanged characters to form a new character;
forming a changed character collation standard from the at least two characters and the new character; and
resorting the sequence of sorted strings based on the changed character collation standard, wherein the sequence of sorted strings is obtained using a classed string comparison using an Unicode Collation Algorithm (UCA).

2. The method according to claim 1, wherein the step of comparing the first character collation standard with the second character collation standard comprises:
finding characters with unchanged adjacent position relations in the second character collation standard based on the first character collation standard; and
recording the characters with unchanged adjacent position relations and the rest of the characters in the second character collation standard, each being an unaffected character block.

3. The method according to claim 2, wherein the sequence of sorted strings is obtained using a non-class string comparing algorithm, and wherein the step of finding characters with unchanged adjacent position relations in the second character collation standard comprises:
searching, in the second character collation standard, for a character in the first character collation standard;
a first judging step comprising judging whether a next character of the searched character in the second character collation standard is its next character in the first character collation standard;
if the result of the first judging step is negative, searching, in the second character collation standard, for the next character of the searched character in the first character collation standard as a new searched character;
for the new searched character, returning to the first judging step;
if the result of the first judging step is positive, combining the searched character and its next character in the second character collation standard into the character with unchanged adjacent position relation;
a second judging step comprising judging whether a next character of the character with unchanged adjacent position relation in the second character collation standard is its next character in the first character collation standard;
if the result of the second judging step is positive, combining the character with unchanged adjacent position relation and its next character in the second character collation standard into a new character with unchanged adjacent position relation;
for the new character with unchanged adjacent position relation, returning to the second judging step;
if the result of the second judging step is negative, searching, in the second character collation standard, for the next character of the character with unchanged adjacent position relation in the first character collation standard as the new searched character; and
for the new searched character, returning to the first judging step.

4. The method according to claim 2, wherein the sequence of sorted strings is obtained using the classed string comparing algorithm including a plurality of character comparing classes, and wherein the step of finding characters with unchanged adjacent position relations in the second character collation standard comprises:
searching, in the second character collation standard, for a character in the first character collation standard;
a third judging step for judging, at each of the plurality of character comparing classes, whether a next character of the searched character in the second character collation standard is its next character in the first character collation standard;
if, at any one of the character comparing classes, the result of the third judging step is negative, searching, in the second character collation standard, for the next character of the searched character in the first character collation standard as a new searched character;
for the new searched character, returning to the third judging step;
if, at all of the character comparing classes, the result of the third judging step is positive, combining the searched character and its next character in the second character collation standard into the character with unchanged adjacent position relation;
a fourth judging step comprising judging, at each of the plurality of character comparing classes, whether a next character of the character with unchanged adjacent position relation in the second character collation standard is its next character in the first character collation standard;
if, at all of the character comparing classes, the result of the fourth judging step is positive, combining the character with unchanged adjacent position relation and its next character in the second character collation standard into the new character with unchanged adjacent position relation;
for the new character with unchanged adjacent position relation, returning to the fourth judging step;
if, at any one of the character comparing classes, the result of the fourth judging step is negative, searching, in the second character collation standard, for the next character of the character with unchanged adjacent position relation in the first character collation standard as the new searched character; and
for the new searched character, returning to the third judging step.

5. The method according to claim 2, wherein the step of resorting the sequence of sorted strings comprises:
obtaining at least one unaffected string block from the sequence of sorted strings according to the unaffected character blocks, wherein the unaffected string block includes at least one string consisting of the characters belonging to the same unaffected character block;
selecting a string from each of the unaffected string blocks;
replacing the respective unaffected string blocks with the selected strings in the sequence of sorted strings to form a new sequence of strings;
sorting the new sequence of strings according to the second character collation standard; and
replacing the selected strings with the corresponding unaffected string blocks in the sorted new sequence of strings.

6. The method according to claim 5, wherein the step of obtaining at least one unaffected string block from the sequence of sorted strings comprises:
  scanning a string in the sequence of sorted strings;
  determining whether the characters contained in the string are within the same unaffected character block;
  if the characters contained in the string are not within the same unaffected character block, returning to the scanning step;
  if the characters contained in the string are within the same unaffected character block, recording the string as the unaffected string block;
  judging whether the characters contained in a next string of the unaffected string block in the sequence of sorted strings are within the same unaffected character block as the unaffected string block;
  if the result of the judging step is positive, combining the unaffected string block and the next string into a new unaffected string block;
  for the new unaffected string block, returning to the judging step;
  if the result of the judging step is negative, for the characters contained in the next string, returning to the determining step.

7. The method according to claim 1, further comprising:
  defining a common character range;
  judging whether the sequence of sorted string contains a character out of the common character range;
  if the sequence of sorted string contains the character out of the common character range, sorting the sequence of sorted string using an original sorting method; and
  if the sequence of sorted string contains no character out of the common character scope, executing the following steps;
  wherein only characters within the common character range in the first and second character collation standards are compared in the comparing step.

8. An apparatus for resorting a sequence of sorted strings, comprising:
  a hardware device, including:
  an obtaining module for obtaining the sequence of sorted strings by sorting a plurality of strings based on a first character collation standard;
  a comparing module for comparing the first character collation standard with a second character collation standard to perform:
  identifying a change of the character collation standard between the first and second collation standards, wherein the second character collation standard is different from the first character collation standard, and wherein the change of the character collation standard is a change of an adjacent position relation for each of at least two characters,
  identifying at least two unchanged characters in each of the first and second collation standards, wherein the adjacent position for each of the at least two unchanged characters does not change, and
  combining the least two unchanged characters to form a new character;
  a forming module for forming a changed character collation standard from the at least two characters and the new character; and a resorting module for resorting the sequence of sorted strings based on the changed character collation standard, wherein the sequence of sorted strings is obtained using a classed string comparison using an Unicode Collation Algorithm (UCA).

9. The apparatus according to claim 8, wherein the comparing module comprises:
  a finding unit for finding characters with unchanged adjacent position relations in the second character collation standard based on the first character collation standard; and
  a recording unit for recording the characters with unchanged adjacent position relations and the rest of the characters in the second character collation standard, each being an unaffected character block.

10. The apparatus according to claim 9, wherein the finding unit comprises:
  a searching unit for searching, in the second character collation standard, for a character in the first character collation standard;
  a character judgment unit for judging whether a next character of the searched character or a character with unchanged adjacent position relation in the second character collation standard is its next character in the first character collation standard, and enables the searching means to search, in the second character collation standard, for the next character of the searched character or the character with unchanged adjacent position relation in the first character collation standard when the judgment result is negative; and
  a character combination unit for combining the searched character with its next character in the second character collation standard into the character with unchanged adjacent position relation when the next character of the searched character in the second character collation standard is its next character in the first character collation standard; and combines the character with unchanged adjacent position relation and its next character in the second character collation standard into a new character with unchanged adjacent position relation when the next character of the character with unchanged adjacent position relation in the second character collation standard is its next character in the first character collation standard.

11. The apparatus according to claim 9, wherein the resorting module comprises:
  an obtaining unit for obtaining at least one unaffected string block from the sequence of sorted strings according to the unaffected character blocks, wherein the unaffected string block includes at least one string consisting of the characters belonging to the same unaffected character block;
  a selecting unit for selecting a string from each of the unaffected string blocks;
  a replacing unit for replacing the respective unaffected string blocks with the selected strings in the sequence of sorted strings to form a new sequence of strings, and replaces the selected strings with the corresponding unaffected string blocks in the sorted new sequence of strings; and
  a sorting unit for sorting the new sequence of strings according to the second character collation standard.

12. The apparatus according to claim 11, wherein the obtaining unit comprises:
  a scanning unit for scanning a string in the sequence of sorted strings;
  a determining unit for determining whether the characters contained in the string or the next string of the unaffected string block are within the same unaffected character block;

a recording unit for recording the string as the unaffected string block when the characters contained in the string are within the same unaffected character block;

a string judgment unit for judging whether the characters contained in a next string of the unaffected string block in the sequence of sorted strings are within the same unaffected character block as the unaffected string block, and enabling the determining means to determine whether the characters contained in the next string of the unaffected string block are within the same unaffected character block when the judgment result is negative; and a string combination unit for combining the unaffected string block and its next string into a new unaffected string block when the judgment result is positive.

13. The apparatus according to claim 11, further comprising:

a common character set for storing a predefined common character range; and a common character judgment module for judging whether the sequence of sorted string contains a character out of the common character range, and when it is judged that the sequence of sorted string contains no character out of the common character range, transmitting the sequence of sorted strings to the resorting module;

wherein the comparing module only compares the characters within the common character range in the first and second character collation standards.

\* \* \* \* \*